United States Patent [19]
Wakao et al.

[11] Patent Number: 5,785,145
[45] Date of Patent: Jul. 28, 1998

[54] ARRANGEMENT OF CIRCUIT CASINGS AND CIRCUIT BOARDS IN A POWER STEERING DEVICE

[75] Inventors: Hirokazu Wakao, Kani; Akira Endo, Gifu-ken; Yoshinori Kogiso, Mizunami, all of Japan

[73] Assignee: Kayaba Industry Co., Inc., Tokyo, Japan

[21] Appl. No.: 583,226

[22] Filed: Jan. 4, 1996

[30] Foreign Application Priority Data

Jan. 19, 1995 [JP] Japan ................. 7-023274

[51] Int. Cl.$^6$ .................................... B62D 5/04
[52] U.S. Cl. ............................. 180/443; 180/400
[58] Field of Search ..................... 180/443, 444, 180/446, 421, 422, 423, 426, 400, 404; 318/1, 3

[56] References Cited

U.S. PATENT DOCUMENTS

| | | | |
|---|---|---|---|
| 4,598,787 | 7/1986 | Drutchas | 180/446 |
| 4,660,669 | 4/1987 | Shimizu | 180/444 |
| 4,742,882 | 5/1988 | Shimizu et al. | 180/444 |
| 4,874,053 | 10/1989 | Kimura et al. | 180/443 |
| 4,972,914 | 11/1990 | Asanuma | 180/444 |
| 4,986,381 | 1/1991 | Morishita et al. | 180/446 |
| 5,021,721 | 6/1991 | Oshita et al. | 180/446 |
| 5,355,315 | 10/1994 | Daido et al. | 180/446 |
| 5,573,079 | 11/1996 | Suda et al. | 180/446 |

*Primary Examiner*—Brian L. Johnson
*Assistant Examiner*—Gary Savitt
*Attorney, Agent, or Firm*—Steinberg & Raskin, P.C.

[57] ABSTRACT

An arrangement of circuit casings and circuit boards in a motorized power steering device including a drive circuit casing, a control circuit casing and a gear casing connected to the drive circuit casing. The drive circuit casing includes a drive circuit board provided thereon with a drive circuit whereas the control circuit casing includes a control circuit board provided thereon with a control circuit for outputting a control signal to the drive circuit. An electric motor is attached to the drive circuit casing such that the drive circuit casing is interposed between the gear casing and the electric motor.

20 Claims, 3 Drawing Sheets ns 5,785,145

ARRANGEMENT OF CIRCUIT CASINGS AND CIRCUIT BOARDS IN A POWER STEERING DEVICE

BACKGROUND OF THE INVENTION

This invention relates to a motorized power steering device, and more particularly to a motorized power steering device adapted to carry out power assisting by means of an output of an electric motor.

A motorized power steering device which has been conventionally used for this purpose is generally constructed in such a manner as shown in FIG. 3. More particularly, the conventional motorized power steering device includes a gear casing 1 provided therein with a rack shaft and a pinion shaft, as well as a motor casing 3 and is connected to a controller 5 arranged in a cabin 4 while being separated from an engine room.

The controller 5 includes a control circuit for operating a value of a current fed to an electric motor depending on input torque during steering and a drive circuit for feeding, to the electric motor, a current corresponding to the operated current value.

The conventional motorized power steering device, as described above, is so constructed that the gear casing 1 and controller 5 are arranged in a manner to be separated from each other. Such construction requires to provide a plurality of wirings 6 therebetween, leading to large-sizing of the device due to occupation of much space, as well as an increase in manufacturing cost thereof.

SUMMARY OF THE INVENTION

The present invention has been made in view of the foregoing disadvantage of the prior art.

Accordingly, it is an object of the present invention to provide a motorized power steering device which is capable of accomplishing both space saving and cost saving.

It is another object of the present invention to provide a motorized power steering device which is capable of exhibiting satisfactory heat dissipation.

It is a further object of the present invention to provide a motorized power steering device which is capable of simplifying a wiring structure.

It is still another object of the present invention to provide a motorized power steering device which is capable of accomplishing down-sizing of the device.

In accordance with the present invention, a motorized power steering device is provided. The motorized power steering device includes a drive circuit board provided thereon with a drive circuit, a drive circuit casing having the drive circuit board incorporated therein, a control circuit board provided thereon with a control circuit for outputting a control signal to the drive circuit, and a control circuit casing having the control circuit board incorporated therein. The drive circuit casing and control circuit casing are arranged in proximity to each other. The motorized power steering device also includes a gear casing mechanically connected to the drive circuit casing.

Such construction eliminates arrangement of any external wiring between the drive circuit casing and the control circuit casing, leading to down-sizing of the device and a decrease in manufacturing cost thereof. Also, it permits heat generated from the control circuit casing and drive circuit casing to be effectively dissipated while being transmitted through the gear casing.

Any additional member may be interposedly arranged between the drive circuit casing and the gear casing so long as the drive circuit casing is associated with the gear casing.

Also, the gear casing may be constituted by a plurality of parts formed separately from each other.

Further, the drive circuit casing and control circuit casing may be formed independently from each other. Alternatively, they may be formed integrally with each other in a manner to be internally separated from each other.

In a preferred embodiment of the present invention, the drive circuit casing and control circuit casing each are made of a material increased in thermal conductivity.

Thus, discharge of heat to the gear casing can be satisfactorily accomplished.

In a preferred embodiment of the present invention, the motorized power steering device further includes an electric motor including a brush. The drive circuit includes an output section. The drive circuit casing is arranged between the gear casing and the electric motor. The output section of the drive circuit and the brush of the electric motor are connected to each other through a lead wire.

Such construction permits a wiring for connecting the drive circuit and brush to each other to be simplified in structure.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE PREFERRED EMBODIMENT

Now, a motorized power steering device according to the present invention will be described hereinafter with reference to FIGS. 1 and 2.

Figure 1:
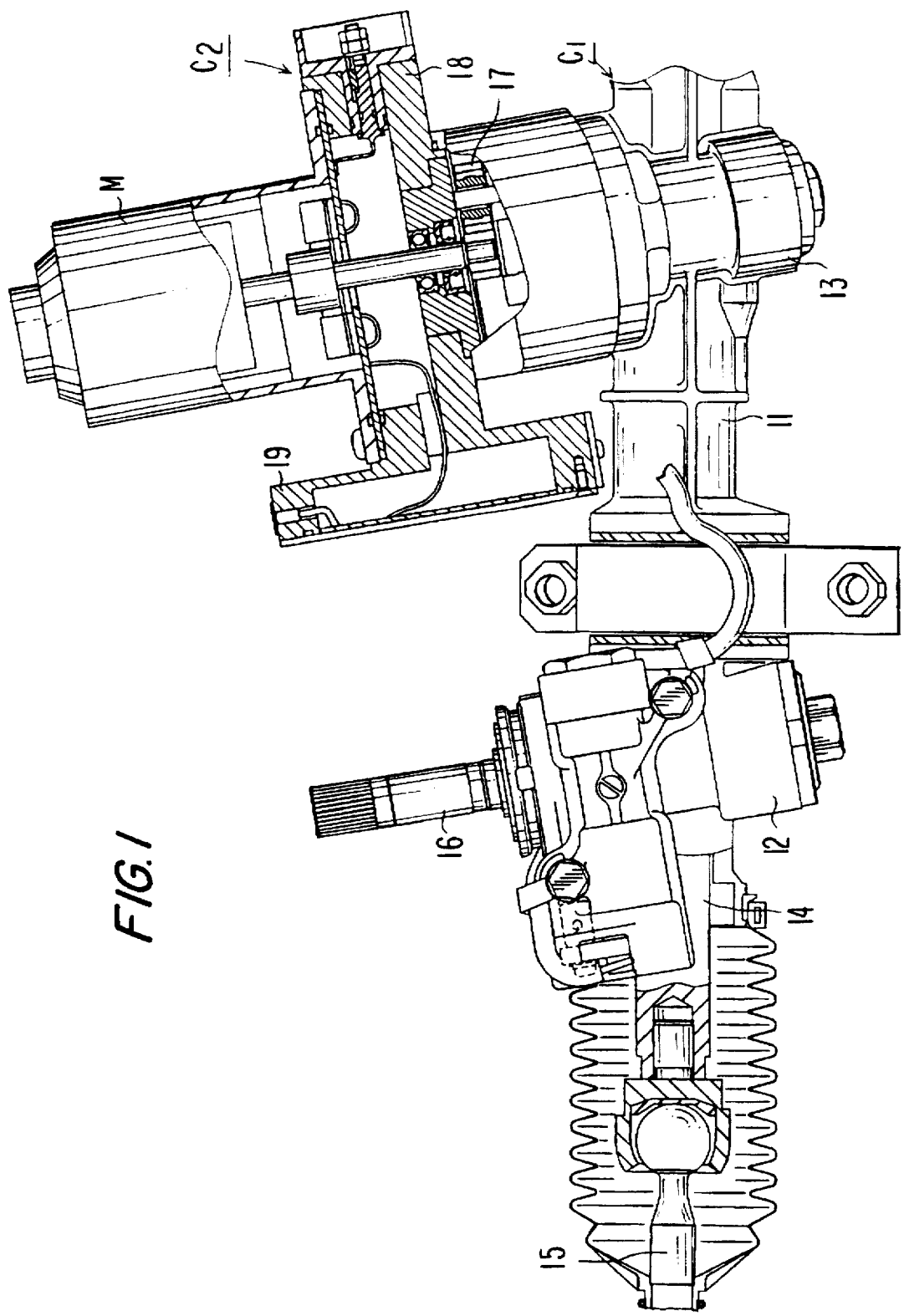
FIG. 1 is a partly sectional view showing an essential part of an embodiment of a motorized power steering device according to the present invention.
Figure 2:
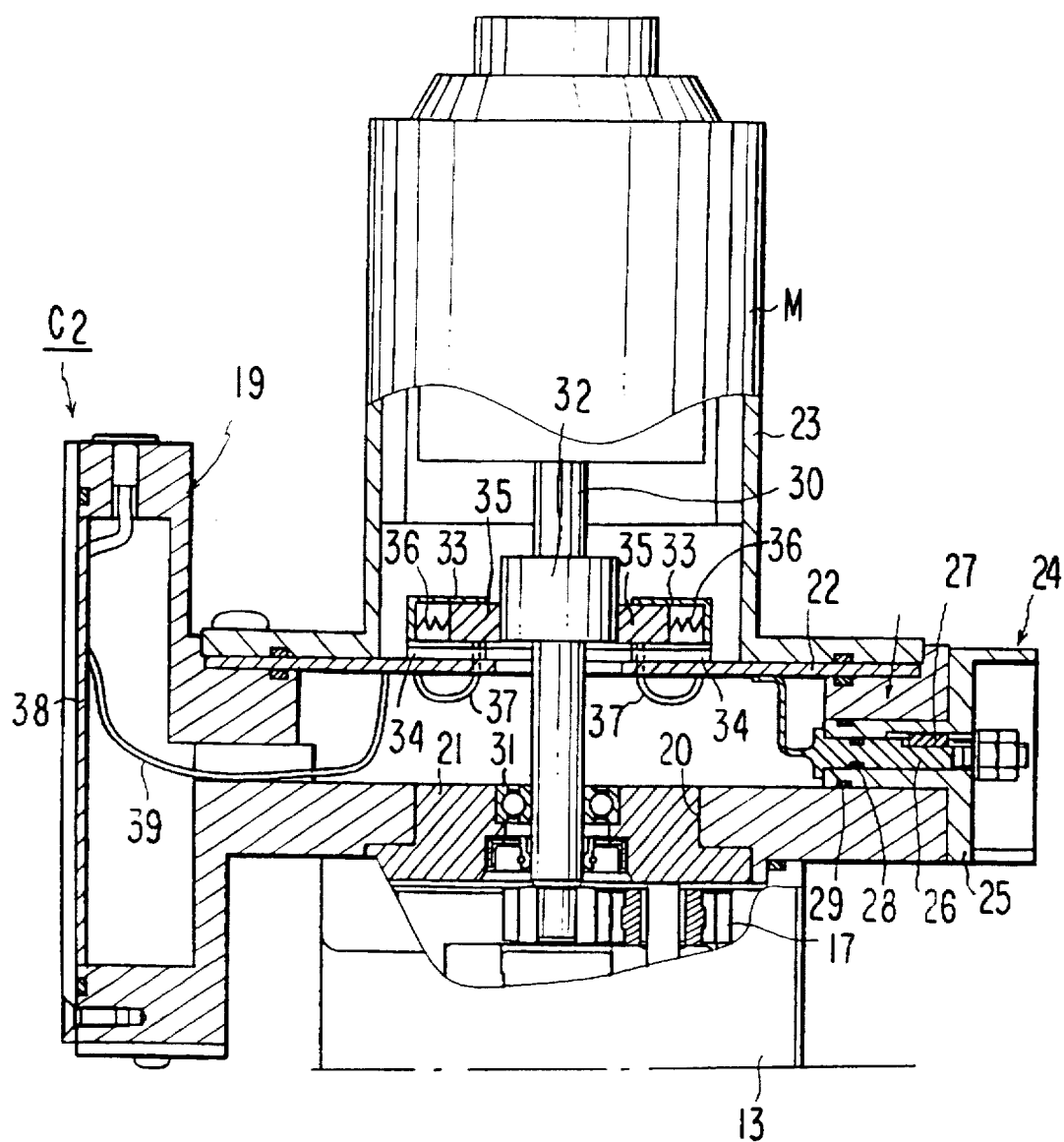
FIG. 2 is an enlarged view partly in section showing a circuit casing and a motor casing which constitute an essential part of the motorized power steering device of FIG. 1.
Figure 3:
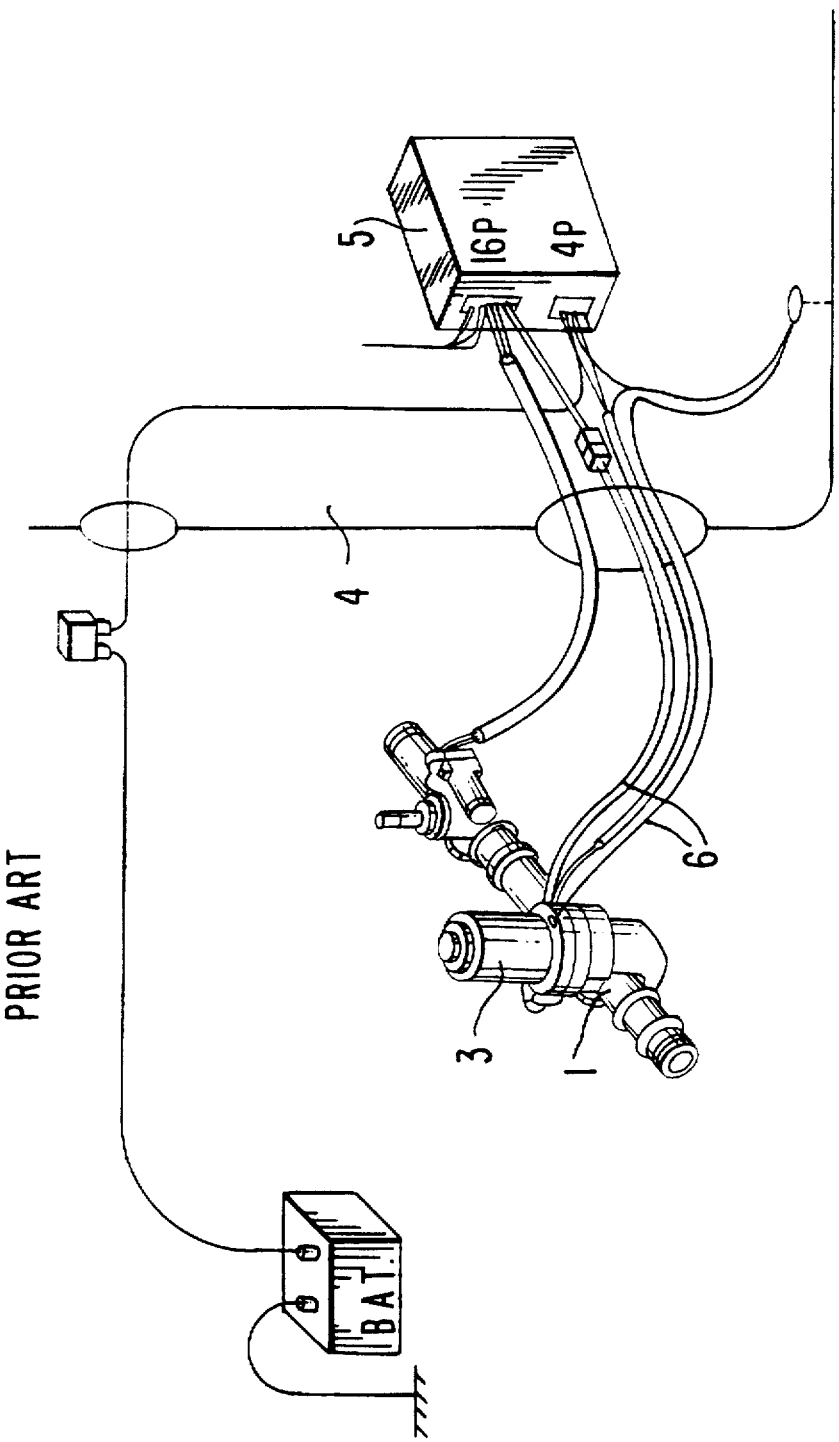
FIG. 3 is a schematic view showing a conventional motorized power steering device.

FIGS. 1 and 2 illustrate an embodiment of a motorized power steering device according to the present invention. A motorized power steering device of the illustrated embodiment includes a gear casing C1, which includes a shaft casing section 11, a pinion casing section 12 and a drive casing section 13. The casing sections 11 to 13 each may be made of aluminum.

The shaft casing section 11 has a rack shaft 14 supportedly arranged therein so as to be movable in an axial direction thereof. The rack shaft 14 is provided at each of both ends thereof with a knuckle arm 15, through which the rack shaft 14 is operatively connected to each of front wheels (not shown).

The pinion casing section 12 has a pinion shaft 16 supportedly arranged therein. The pinion shaft 16 is mounted thereon with a pinion (not shown), which is meshed with a rack (not shown) formed on the rack shaft 14. The pinion shaft 16 is operatively connected to a handle (not shown). Thus, turning of the handle causes the pinion to be rotated; during which steering torque is detected due to an increase in resistance on a wheel side.

The drive casing section 13 has a speed reducer 17 and a pinion (not shown) supportedly arranged therein. The speed reducer 17 is operatively connected to an electric motor M which will be detailedly described hereinafter, so that the pinion is rotated by means of an output of the electric motor M. The pinion is engaged with the rack formed on the rack shaft 14.

Thus, driving force of the electric motor M is transmitted through the speed reducer 17 to the pinion, leading to rotation of the pinion. Then, the rotation of the pinion causes the rack shaft 14 to be moved in a predetermined direction, to thereby carry out steering of the front wheels. Thus, it will be noted that the driving force of the electric motor M acts to assist steering force.

Such movement of the rack shaft 14 by the driving force of the electric motor M as described above causes the pinion and handle arranged on a side of the pinion casing section 12 to be likewise rotated in a steering direction correspondingly. This permits a driver to carry out handle operation without substantially feeling steering load.

The motorized power steering device of the illustrated embodiment also includes a circuit casing C2 made of aluminum, which is connected to the drive casing section 13 of the gear casing C1. The circuit casing C2 includes a drive circuit section 18 and a control circuit section 19 which are formed integrally with each other and separated from each other in the circuit casing C2. More specifically, both circuit casings 18 and 19 are connected to each other so as to define a T-shape in section and the drive circuit casing section which has a drive circuit generating much heat as compared with the control circuit arranged therein is mounted directly on the gear casing C1 exhibiting increased heat dissipation as described hereinafter.

The drive circuit casing section 18, as shown in FIG. 2, is formed at a central portion thereof with a connection hole 20 and correspondingly the drive casing section 13 is provided with a projection 21, so that the projection 21 of the drive casing section 13 is fitted in the connection hole 20 of the drive circuit casing section 18, resulting in the drive circuit casing section 18 and therefore the circuit casing C2 being mechanically fixed to the gear casing C1.

The drive circuit casing section 18 thus connected to the gear casing C1 is fixedly mounted thereon with a drive circuit board 22 on which a drive circuit for controlling an output of the electric motor M is provided by, for example, printing. Then, a motor casing 23 for the electric motor M is fixed on the drive circuit board 22.

Also, the drive circuit casing section 18 is mounted on one end thereof with a connector 24. The connector 24 includes a protective casing 25 made of a resin material and arranged on a periphery of the connector 24 for preventing short-circuit, as well as a terminal 26 incorporated in the protective casing 25. The terminal 26 is connected to the above-described drive circuit printed on the drive circuit board 22. Also, the terminal 26 is held on the protective casing 25 through a key 27, so that relative rotation between the terminal 26 and the protective casing 25 may be prevented.

Further, a seal ring 28 is arranged between the terminal 26 and the protective casing 25, to thereby provide the drive circuit casing section 18 with water-tightness sufficient to prevent water from entering the casing section 18. For the same purpose, a seal ring 29 is arranged between the protective casing 25 and the drive circuit casing section 18.

The electric motor M is housed in the motor casing 23 and includes an output shaft 30, which is arranged so as to extend through the drive circuit casing section 18 into the projection 21 of the gear casing C1 and supported at a distal end thereof in a bearing 31 provided in the projection 21.

The output shaft 30 of the electric motor M is fixedly mounted on a portion thereof positioned in the motor casing 23 with a commutator 32, as well as a brush casing 33 in a manner to be positioned in proximity to the commutator 32. More specifically, the brush casing 33 is fixed on the drive circuit board 22 through an insulator 34.

The brush casing 33 has a brush 35 housed therein. The brush 35 is constantly elastically urged toward or against the commutator 32 by means of elastic force of a spring 36. This effectively prevents the brush 35 from being separated from the commutator 32, to thereby ensure stable rotation of the electric motor M.

The brush 35 is connected through a lead wire 37 to an output section of the drive circuit on the drive circuit board 22. As will be readily noted from FIG. 2, the lead wire 37 is formed into a reduced length. This is attained only due to the featured construction of the illustrated embodiment wherein the drive circuit board 22 is fixed directly on the motor casing 23 and the brush casing 33 is fixed through the insulator 34 on the drive circuit board 22.

The drive circuit casing section 18 is arranged so as to be contiguous on a side thereof opposite to the connector 24 to the control circuit casing section 19. The control circuit casing section 19 is provided with a control circuit board 38 in a manner to be fixed thereon. The control circuit on the control circuit board 38 and the drive circuit on the drive circuit board 22 are connected to each other through a wiring 39.

In the illustrated embodiment, the drive circuit casing section 18 and control circuit casing section 19 are arranged in a manner to be integral with each other. Alternatively, both may be made separately from each other and then mechanically connected to or associated with each other.

Now, the manner of operation of the motorized power steering device of the illustrated embodiment constructed as described above will be described hereinafter with reference to FIGS. 1 and 2.

First, when the handle is turned to apply torque to the shaft 16, the control circuit operates output torque of the electric motor M depending on the torque applied, resulting in the drive circuit being actuated. Then, the electric motor M is driven depending on actuation of the drive circuit, to thereby rotate the pinion arranged in the pinion casing 12, so that the rack shaft 14 is moved in a predetermined direction.

Such movement of the rack shaft 14 is then transmitted through the knuckle arms 15 to the front wheels, leading to steering of the front wheels.

Such control operation would generally cause the control circuit and drive circuit to generate heat. However, the heat thus generated is conducted through the circuit casing C2 to the gear casing C1, resulting in being outwardly discharged or dissipated. In particular, the gear casing C1 is located at a position of a low temperature in an engine room, so that the heat dissipation may be more effectively accomplished.

Thus, the motorized power steering device of the illustrated embodiment causes heat generated by the control circuit casing section 19 and drive circuit casing section 18 to be discharged through the gear casing C1 which is made of aluminum inherently exhibiting increased heat dissipation, to thereby prevent the control circuit and/or drive circuit from being heated to an excessively high temperature. Thus, the illustrated embodiment permits both control circuit casing section 19 and drive circuit casing section 18 to be arranged in proximity to each other in the engine room, resulting in significantly simplifying a wiring structure for the circuits.

Also, both drive circuit casing section 18 and control circuit casing section 19 each are made of aluminum exhibiting increased thermal conductivity, so that transmission of the heat to the gear casing C1 being substantially improved.

Further, the brush 35 of the electric motor M is constantly urged against the commutator 32 by elastic force of the spring 36, to thereby be prevented from being separated from the commutator 32, so that driving or rotation of the electric motor M may be significantly rendered stable.

Moreover, the drive circuit casing section 18 is arranged in a manner to be perpendicular to the control circuit casing section 19, so that the control circuit casing section 19 may be arranged laterally of the drive casing section 13 as shown in FIG. 1. The the prior art necessarily causes a dead space to be defined laterally of such a drive casing section. The above-described arrangement of the control circuit casing section in the motorized power steering device eliminates such a dead space.

As can be seen from the foregoing, the motorized power steering device of the present invention is so constructed that the control circuit casing is arranged in proximity to the drive circuit casing. Such construction of the present invention eliminates arrangement of any external wiring between control circuit casing and drive circuit casing, leading to down-sizing of the device and a decrease in manufacturing cost thereof.

Also, both control circuit casing and drive circuit casing are made of a material exhibiting increased thermal conductivity, so that discharge of heat to the gear casing may be satisfactorily accomplished.

Further, the present invention permits the wiring for connecting the drive circuit and brush to each other to be simplified.

While a preferred embodiment of the invention has been described with reference to the drawings, obvious modifications and variations are possible in light of the above teachings. It is therefore to be understood that within the scope of the appended claims, the invention may be practiced otherwise than as specifically described.

What is claimed is:

1. An arrangement of circuit casings and circuit boards in a motorized power steering device comprising:
   a drive circuit casing including a drive circuit board having a drive circuit;
   a control circuit casing including a control circuit board having a control circuit for outputting a control signal to said drive circuit, said control circuit casing being connected to said drive circuit casing;
   a gear casing connected to said drive circuit casing; and
   an electric motor attached to said drive circuit casing;
   said gear casing and said electric motor casing being connected to said drive circuit casing such that said drive circuit casing is interposed between said gear casing and said electric motor of the motorized power steering device.

2. The arrangement of claim 1, wherein said drive circuit casing and said control circuit casing are made of a thermally conductive material.

3. The arrangement of claim 1, wherein said electric motor includes a brush;
   said drive circuit including an output section;
   said output section of said drive circuit and said brush of said electric motor being connected to each other through a lead wire.

4. The arrangement of claim 1, wherein said drive circuit casing and said control circuit casing are formed integral with one another to constitute a circuit casing, wherein said drive circuit casing and said control circuit casing are separate from one another in said circuit casing.

5. The arrangement of claim 1, wherein said gear casing includes a shaft casing section, a pinion casing section and a drive casing section.

6. The arrangement of claim 5, further comprising a speed reducer arranged in said drive casing section.

7. The arrangement of claim 6, wherein said speed reducer is operatively connected to said electric motor.

8. The arrangement of claim 5, wherein said drive circuit casing and said drive casing section of said gear casing are directly connected to one another.

9. The arrangement of claim 8, wherein said drive circuit casing has a connection hole and said drive casing section of said gear casing has a projection adapted to fit into said connection hole.

10. The arrangement of claim 9, wherein said motor includes an output shaft extending through said drive circuit casing into said projection.

11. The arrangement of claim 1, further comprising an electrical connector mounted on said drive circuit casing.

12. The arrangement of claim 11, wherein said connector includes a protective casing, a terminal incorporated into said protective casing and connected to said drive circuit, and a key to prevent relative rotation between said terminal and said protective casing.

13. The arrangement of claim 12, further comprising a seal ring arranged between said terminal and said protective casing.

14. The arrangement of claim 12, further comprising a seal ring arranged between said protective casing and said drive circuit casing.

15. The arrangement of claim 1, wherein said gear casing, said drive circuit casing and said control circuit casing are made of aluminum.

16. The arrangement of claim 1, wherein said motor includes an output shaft having a commutator, further comprising
   a brush casing mounted on said drive circuit casing, said brush casing including a brush and means for urging said brush against said commutator.

17. The arrangement of claim 16, further comprising a wire for connecting said brush to said drive circuit.

18. The arrangement of claim 1, further comprising a wire for connecting said drive circuit and said control circuit.

19. The arrangement of claim 1, wherein said drive circuit casing and said control circuit casing are directly connected to one another and said gear casing is mechanically connected to said drive circuit casing.

20. The arrangement of claim 1, wherein said motor includes an output shaft extending through said drive circuit board in said drive circuit casing into said gear casing.

* * * * *